Dec. 15, 1942.     N. SLOANE ET AL     2,305,277
PLASTIC SNAP FASTENER
Filed July 3, 1942
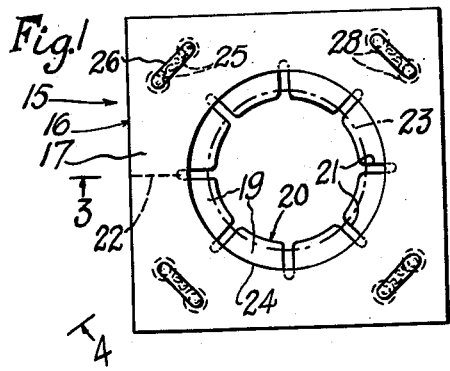
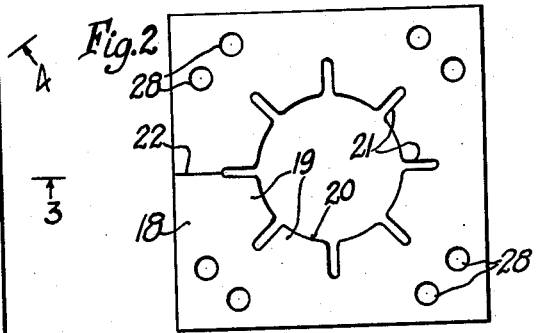
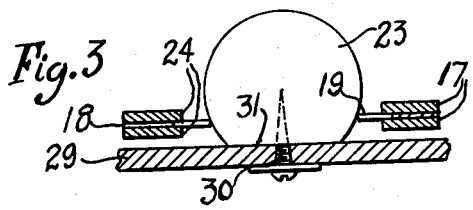
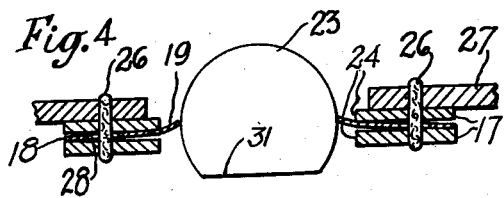
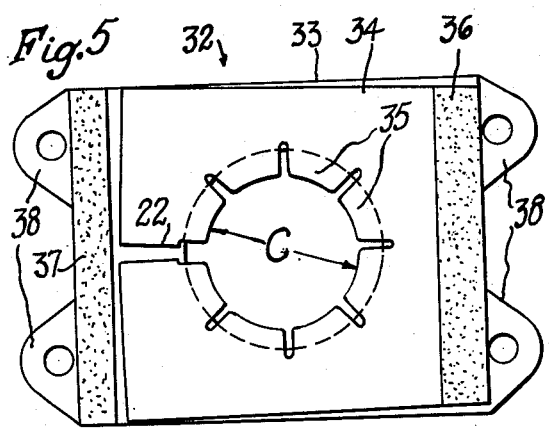
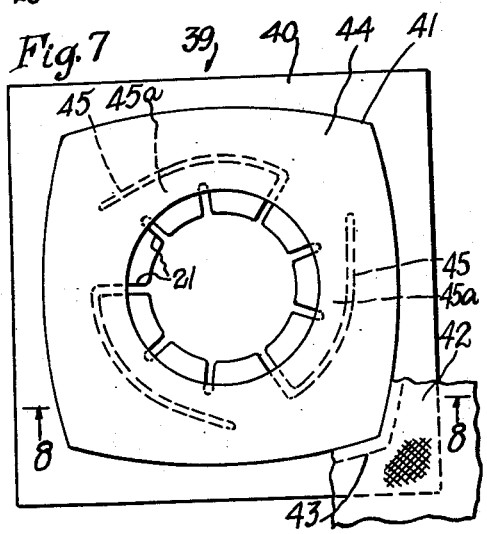
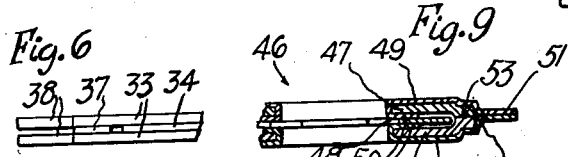
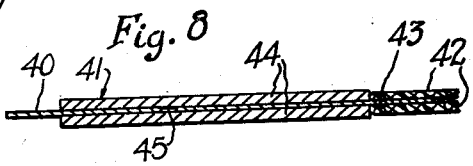
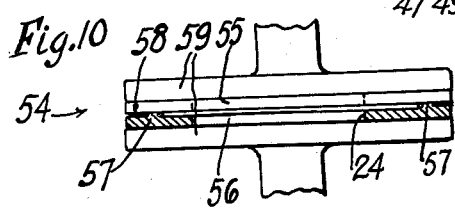
Inventors: Nathan Sloane
and Max Sloane
by Louis Schumacher, Atty.

Patented Dec. 15, 1942

2,305,277

UNITED STATES PATENT OFFICE 2,305,277

PLASTIC SNAP FASTENER

Nathan Sloane and Max Sloane, New York, N. Y.

Application July 3, 1942, Serial No. 449,628

3 Claims. (Cl. 24—216)

This invention relates to snap fasteners and has particular reference to such fasteners made of plastics.

One object of the invention is to provide an improved spring operating fastener made wholly of plastic material, or at least without requiring any metal.

Another object of the invention is to furnish a fastener wherein conventional plastic sheets can be arranged to provide resilient action.

Another object of the invention is the provision of such a fastener wherein improved means affords a controlling reenforcement for the resilient plastic part.

Another object of the invention is to construct a snap fastener having a relatively plane tongued sheet having the elastic characteristics of plastic material, and improved means for mounting the same and for cooperating therewith to prevent breakage or undue distortion of the tongues.

Another object of the invention is to furnish an improved fastener having a closed series of resilient tongues and means whereby the series can be generally circularly elastically expanded to increase the range of engagement of the tongues with a head or the like.

Another object of the invention is to provide an improved housing to permit the elastic circular expansion mentioned.

Another object of the invention is to furnish a fastener having improved means such that it may include a decorative housing that may be made of wood, fiber board, or hardened paper compositions, and the like.

Another object of the invention is to construct a fastener the parts of which can be assembled by adhesive action, as by using acetone, glue, or the like.

Another object of the invention is the provision of a fastener wherein the spring plate may be used for mounting or sewing the fastener on an article.

Another object of the invention is to provide a fastener wherein an element for cushioning the deflection of the spring tongues can also serve for the direct securement or sewing of the fastener to an article, and even for decorating the fastener.

Another object of the invention is to furnish a fastener such that the mounting or securing means for the fastener cooperates to cause a cushioning of the spring tongues, directly or by means of the housing for the spring plate.

Another object of the invention is the provision of a fastener adapted to afford the advantages noted and which can be made by quantity production according to improved methods herein described.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawing:

Figure 1 is a plan view of a fastener embodying the invention, with a fastener head indicated in dot-dash lines.

Fig. 2 is a plan view of the spring plate.

Fig. 3 is a sectional view on the lines 3—3 of Fig. 1, but also showing the male part of the fastener.

Fig. 4 is a sectional view on line 4—4 of Fig. 1, showing the spring tongues deflected by the head and cushioningly restrained by the housing of the fastener, which latter is connected to an article.

Fig. 5 is a plan view of a modified fastener with one housing plate removed, and the spring plate expanded in a generally circular manner.

Fig. 6 is a fragmentary edge view of the fastener of Fig. 5.

Fig. 7 is a plan view of another modified fastener, showing a fragmentary portion of an article to which the extended spring plate is stitched.

Fig. 8 is a sectional view taken on line 8—8 of Fig. 7.

Fig. 9 is a fragmentary sectional view of another modified fastener.

Fig. 10 is a view in edge elevation of still another modification of the fastener, but illustrating a novel, improved method of assembling fasteners which is applicable directly or by indicated modification to all of the fasteners shown herein, one part of the fastener being in section.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Referring in detail to the drawing, 15 denotes a fastener embodying the invention. The same may consist of only three parts, each merely cut out of plane sheet stock of suitable material. Thus there may be a housing 16 formed of two identical members 17, and an intermediate spring plate 18, these parts being wholly plane. The spring plate may have a series of tongues 19 defining a central opening 20, with the tongues being separated by slots or openings 21 whose closed ends are curved. These tongues 19 and the opening 20 can be of various sizes and shapes; for instance the opening 20 may be triangular although herein shown as circular. These tongues 19 are adapted for lateral deflection in either direction as shown in Fig. 4. For circular deflection of the series of tongues, the plate 18 is split as at 22 by a slit extending from the edge to one of the openings 21, so that the series of tongues can expand simultaneously with the deflection thereof. Such expansion is indicated in Fig. 5, and its advantage is that a male or head element such as 23 may be used which is sufficiently large so that considerable wear can occur at the ends of the tongues 19 without affecting the usefulness of the fastener. In certain cases, the resilient engagement may be too tight, but if the slit 22 is employed very little accuracy is required for a smooth functioning of the fastener, considering that the tongues are stiff and lie in a plane.

The plates 17 have registering holes 24 of like size, such that the outer ends of the slots 21 lie within the housing 16, so that the latter affords ample support to the tongues 19.

To afford a cushioning support for the tongues, or to readily mount the fastener 15 on an article, or for both purposes, the plates 17 may be yieldingly connected together in a suitable manner, as by tack stitching of plain or elastic thread. Thus a plurality of pairs of registering holes 25 are formed in each plate 17 so that a tacking 26 can act in each pair of holes. This tacking may also secure the housing 16 to any article such as 27 shown in Fig. 4.

To properly position the spring plate 18, desirably without restraining circular expansion thereof, the tacking 26 may accomplish the third purpose of passing through pairs of holes 28 in the plate 18, but these holes are larger than those at 25 to permit freedom of expansion and contraction for the spring plate 18. Thus in one operation, the fastener 15 is operatively assembled and secured to a handbag, coat or other article, and in fact the tacking becomes an operative part of the fastener structure, freely guiding and mounting the spring plate 18 thereof.

It will be understood that the tacking permits a yielding separation of the plates 17 to cushioningly support the tongues in lateral deflection.

The male part 23 is mounted in any feasible manner on any article 29 as by a screw 30, which may be conventional practise. If the head 23 be spherical, it should be cut off at 31 to avoid excessive axial play, but to afford sufficient tolerance for the movement of the tongues in the axial direction.

The plates 17, 18 may be made of plastic material, but the plates 17 may be made of any other material such as wood, fiber or stiffened cardboard. The plate 18 may be made of a plastic which possesses ample resilience.

The observations above made are intended to apply to the subsequent modifications, except where otherwise stated.

In Figs. 5 and 6 is shown a modified fastener 32 comprising a pair of identical plates 33, between which is disposed a spring plate 34 that may be exactly like that at 18, but is here shown circularly expanded. It is a feature of this plate 34 that the series of tongues 35 form an opening true to the shape of the male part of the fastener when said series is expanded by the head for engaging or disengaging the fastener 32. This shape may be a true circle as indicated by the letter C. Thus the stress on the different tongues is quite uniform. This fastener 32 is also different in that the parts thereof are operatively pasted or cemented or autogenously secured together as by the use of acetone. To obtain an operation like that of the device 15, the plates 33 are cemented to opposite faces of the spring plate as indicated by the dotted area at 36. At the side adjacent to the split 22, a filler strip 37 of the same or slightly greater thickness with the plate 34 may be inserted and cemented at its opposite faces to secure the plates 33 together. For mounting on an article, any suitable fastening means or openings may be provided such as the ears 38 by which the fastener can be secured by sewing or lacing.

The use of acetone presents a difficulty, because if it should accidentally contact essential spring parts of the plastic plate 34 they will permanently lose their life or resilience. Hence the acetone may be applied only at 36 and 27.

The plates 33 afford a housing of definite size to properly fit the spring plate 34 and to permit its free operation while mounting the latter in required position. Moreover, as the plates 33 are interconnected only at their ends, the slight resilience they possess may permit them to centrally spring apart a little for a cushioning supporting or reenforcing action on the tongues 35.

Where the housing of any fastener herein is made of plastic plates, they may be in the same or contrasting colors for reversible and other use to suit the colors of articles with which they are used. By employing lacing with the ears 38, the lacing can be removed for reversing the fastener, and may then be replaced.

In Figs. 7 and 8 is shown a modification of a fastener 39 wherein the spring plate 40 extends outside of the housing 41 to form a means for securement of the fastener to an article 42 as by stitching 43. Because the spring plate is fairly thin, the needle will readily pierce the same. In order that the securement shall be strong all around, the plates 44 which form the housing 41 may be cemented at their edges continuously to the plate 40, or riveted or otherwise connected together. If the circular expansion be desired, the spring plate may have a series of arc shaped slots leading from certain openings 21 to form expansible tongue carrying segments 45a.

In Fig. 9 is shown another modification of the fastener, such as 46, but this indicates how an interconnecting means for the housing plates 47 of the spring plate 48 may be used for mounting or connecting the fastener to an article. The housing plates 47 may be like those hereinabove described, but over each is externally placed a covering element 49 of textile fabric, leather or other suitable ornamental material. Each element 49 is centrally perforated and folded inward as at 50, and thus cemented to its plate 47. Portions of the elements extend all around beyond the plates 47 as at 51 and are sewn together at 52 closely to the plates 47 to thus hold the plates together. The cloth lips 50 may afford cushioning for the tongues of the spring plate 48. The housing plates 47 being concealed, may be made of fiber. They may be slightly cupped to afford clearance for the plate 48 and the lips 50, and dabs of glue may be applied at 53 for reenforced engagement between the housing plates. The cup shaped feature is further shown in Fig. 10 for mounting the fastener 46. The marginal portion 51 may be directly sewn to an article.

Fig. 10 illustrates still another modified fastener 54 and a method of making the same. A housing for a spring plate such as 17, 34 or 40, may include a pair of plates as hereinabove disclosed, of which plate 55 may be plane and the plate 56 may be cupped, as by a lip 57 to assure a chamber enclosing and freely fitting the spring plate 56. Preferably, beyond the annular lip 57, the plates may be slightly spaced as at 58 so minutely as to permit acetone or adhesive to flow in and secure the plates together. It is important to note that the lip 57 excludes the liquid from the spring plate and its chamber.

An excellent method of quick assembling includes the fastener 54 secured in a clamp including jaws 59 which close and seal the plate openings such as 24 and may even completely cover the decorative faces of the housing. When thus held under pressure the fastener can be dipped in acetone or adhesive, the clamping pressure assuring that the lip 57 seals tight. The minute annular space at 58 is exposed for entry of the liquid. After hardening the clamp can be removed, and the fastener is complete.

It will be noted that the features shown in Figs. 5, 7, 9 and 10 can be interchangeably used in various arrangements and combinations.

The fasteners herein provided may each provide for resilient deflection laterally or along the plane of the spring plate, for instance, circularly, or both. The expanded spring opening may accurately fit the fastener head as in Fig. 5, and according to Fig. 7, an odd number of spring tongues may be used, with the slots 45 so arranged that a tongue which does not yield in the plane of the plate 40 lies almost diametrically opposite one which has substantial yield in that plane, to thus assure relatively even circular bearing on a fastener head. The fasteners may be used for articles such as mentioned, and also for luggage, cabinets and many other devices.

The term interconnecting means as used herein may include the tacking 26, the adhesive or autogenous union, and the connection by means of leather, paper or textile fabric 49 with its stitching at 52, and it may also include the marginal portions of the plates 55, 56. The term lacing may include the tacking 26. The term adhesive may comprise the use of acetone. Yielding connecting means may include the tacking 26 and the structure as in Figs. 5 and 9, because in the former the securement is only at 36 and 37, and in the latter some yield will occur adjacent to the stitching 52. The term supporting means may include the fabric 42 and 51.

In referring to the thinness of the member 18, it will be understood that it is self sustaining, except under the strains of ordinary usage for its intended purpose. This member will tend to belly when the tongues 19 are bent by a fastener head, and hence the walls or plate elements such as 17 should be yieldingly engageable for laterally supporting the tongues or only the member 18 itself. Thus the plate elements may be separable by an inherent small degree of resilience or by yield of the interconnecting means or by cushioning as by the lips 47, and because the interconnecting means is substantially spaced from the central region about the tongues as in Fig. 7 and in the other forms shown.

We claim:

1. A device including a socket structure comprising a plane member having a plurality of tongues defining a resilient socket for a fastener head, said member consisting of a plastic material having a high degree of resilience and being sufficiently thin so as to be adapted to be punctured by the needle of a sewing machine, plane plates on opposite sides of said member adhesively joined to the said member, for reenforcing the socket, said member projecting beyond the plates, a support, and a continuous line of stitching passing through the projecting portion of the member and the support to mount socket structure.

2. A device including a socket structure comprising a plane member having a plurality of tongues defining a resilient socket for a fastener head, said member consisting of a plastic material having a high degree of resilience and being sufficiently thin so as to be adapted to be punctured by the needle of a sewing machine, plane plates on opposite sides of the member secured thereto in order to provide a reenforcement for the socket, said member having a portion projecting beyond the plates, a support having a plurality of plies of fabric receiving said projecting portion therebetween, said plies extending up to the plates to form substantially continuous surfaces therewith, and a line of stitching passing through the plies and the projecting portion for mounting the socket structure.

3. A device including a socket structure comprising a plane member having a plurality of tongues defining a resilient socket for a fastener head, a plate means at the socket for reenforcing the same, the member consisting of a plastic material having a high degree of resilience and being sufficiently thin so as to be adapted to be punctured by the needle of a sewing machine, said member projecting substantially continuously radially beyond the plate means to afford a generally annular securement portion that is readily severable for different conditions, a support, and stitching passing through the projecting portion and the support for mounting the socket structure.

NATHAN SLOANE.
MAX SLOANE.